United States Patent
Staar et al.

(10) Patent No.: US 10,885,323 B2
(45) Date of Patent: Jan. 5, 2021

(54) DIGITAL IMAGE-BASED DOCUMENT DIGITIZATION USING A GRAPH MODEL

(71) Applicant: International Business Machines Corporation, Armonk, NY (US)

(72) Inventors: Peter Willem Jan Staar, Wadenswil (CH); Michele Dolfi, Zurich (CH); Christoph Auer, Zurich (CH); Leonidas Georgopoulos, Zurich (CH); Konstantinos Bekas, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/288,789

(22) Filed: Feb. 28, 2019

(65) Prior Publication Data

US 2020/0279107 A1    Sep. 3, 2020

(51) Int. Cl.
*G06K 9/00* (2006.01)
(52) U.S. Cl.
CPC ................. *G06K 9/00442* (2013.01)
(58) Field of Classification Search
None
See application file for complete search history.

(56) References Cited

U.S. PATENT DOCUMENTS

| | | | | |
|---|---|---|---|---|
| 5,669,007 A | * | 9/1997 | Tateishi | G06K 9/2054 |
| | | | | 715/210 |
| 5,841,900 A | * | 11/1998 | Rahgozar | G06K 9/00469 |
| | | | | 382/176 |
| 2008/0187240 A1 | * | 8/2008 | Takebe | G06K 9/00463 |
| | | | | 382/278 |
| 2017/0004374 A1 | | 1/2017 | Osindero | |
| 2018/0204360 A1 | | 7/2018 | Bekas et al. | |
| 2019/0180097 A1 | * | 6/2019 | Ferguson | G06K 9/6267 |
| 2020/0226364 A1 | * | 7/2020 | Gehler | G06K 9/00456 |

FOREIGN PATENT DOCUMENTS

EP    3104302 B1    5/2018

OTHER PUBLICATIONS

Microsoft, "Windows Image Acquisition (WIA)", https://docs.microsoft.com/en-us/windows/desktop/wia/-wia-startpage, May 30, 2018, 9 pages.

* cited by examiner

*Primary Examiner* — Justin P. Misleh
(74) *Attorney, Agent, or Firm* — Scully, Scott, Murphy & Presser. P.C.; Daniel P. Morris

(57) ABSTRACT

A computer-implemented method for digitizing a document, wherein the document has assigned a classification scheme may be provided. A digital image and an identifier of the classification scheme may be received, the image representing a portion of the document. A segmentation of the image may be determined into one or more image segments; for each of the image segments, content information may be captured from the image segment and a category may be assigned to the image segment, the category being selected from the classification scheme. One or more digitization segments may be selected from the segmentation. A graph model of the document may be populated, wherein each of the digitization segments is represented by a segment node of the graph model.

20 Claims, 2 Drawing Sheets

DIGITAL IMAGE-BASED DOCUMENT DIGITIZATION USING A GRAPH MODEL

BACKGROUND

The present disclosure relates to capturing and digitization of content information from a digital image representing a portion of a document.

Currently, many companies and public institutions are in the process of digitization of printed documents. Due to the large variety and amount of documents, digitization is a very broad concept and it is often quite complicated to implement. Typically, companies and institutions have stockpiles of documents such as research and technical reports in their (paper) archives. In addition, these archives are growing at a fast rate, as more and more reports come in with a scanned format.

While scanning paper archives as well as storing scans of new technical reports appears like a step in the right direction, this does not fully solve the digitization problem. This is primarily because the data encoded in these scanned documents is not searchable. A simple scanning of documents does not allow for adequately accessing the content incorporated in these documents.

Furthermore, it might be that the scanned documents (both old and new) are of a poor quality due to errors in the scanning system and these poor scans (low resolution, bad toner, dirty scanning surface, skewed, etc.) may be only detected at a later time (e.g. during an off-line post-processing phase), when the content is often difficult to recover or even lost.

SUMMARY

In one aspect, a computer-implemented method for digitizing a document may be provided. In one aspect, the document may be assigned a classification scheme. The method, in one aspect, may include receiving a digital image and an identifier of the classification scheme, the image representing a portion of the document. The method may also include determining a segmentation of the image into one or more image segments. The method may also include, for each of the image segments, capturing content information from the image segment and assigning a category to the image segment, the category being selected from the classification scheme. The method may also include selecting one or more digitization segments from the segmentation. The method may also include populating a graph model of the document, wherein each of the digitization segments is represented by a segment node of the graph model, each segment node indicating the category assigned to the digitization segment represented by the segment node and the content information captured from the digitization segment represented by the segment node.

In a further aspect, a computer program product may be provided, in particular a computer readable medium, the computer program product carrying computer executable code for execution by a processor controlling an apparatus, wherein execution of the instructions cause the processor to perform a method for digitizing a document. The document, in one aspect, may be assigned a predetermined classification scheme. The method, in one aspect, may include receiving a digital image, the image representing a portion of the document. The method may also include determining a segmentation of the image into one or more image segments. The method may also include, for each of the image segments, capturing content information from the image segment and assigning a category to the image segment, the category being selected from the classification scheme. The method may also include selecting one or more digitization segments from the segmentation. The method may also include populating a graph model of the document, wherein each of the digitization segments is represented by a segment node of the graph model, each segment node comprising the category assigned to the digitization segment represented by the segment node and the content information captured from the digitization segment represented by the segment node.

Embodiments of the invention are given in the dependent claims. Embodiments of the present invention can be freely combined with each other if they are not mutually exclusive.

BRIEF DESCRIPTION OF THE DRAWINGS

In the following, embodiments of the invention are explained in greater detail, by way of example only, making reference to the drawings in which.

DETAILED DESCRIPTION

Figure 1:
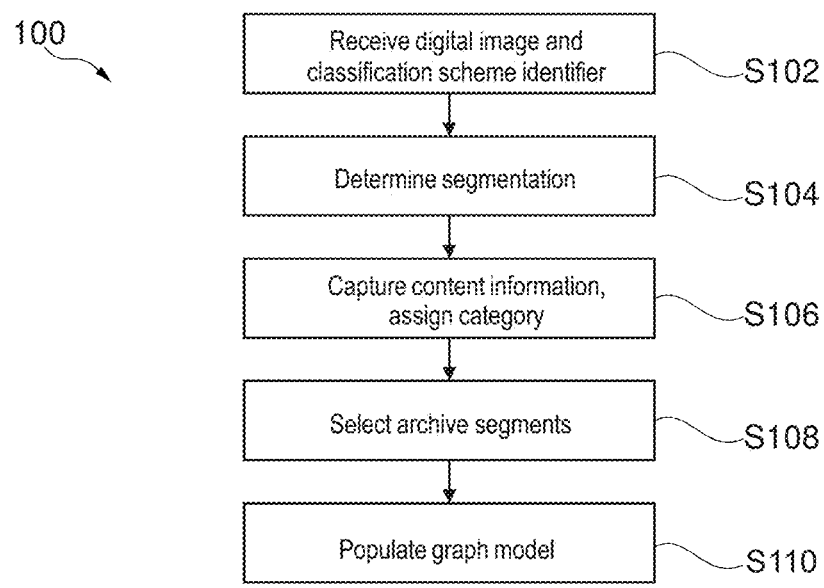
FIG. 1 depicts a flow diagram of a method for digitizing a document.

Digitization of paper documents presently often proceeds up to the step of capturing (e.g. scanning) and storing one or more digital images from the documents. The quality and content of digitized document images can usually only be evaluated by a human reader. Therefore, one would like to have an approach to digitization of analog documents which allows for receiving feedback of the scanning system whether the documents have been processed correctly, and making the data encoded in the documents searchable.

A "document" is understood herein as any source of information which is stationary, with or without electrical or other power supply, and can by represented by a digital image. A "digital image" is understood herein as any data object which can be processed by a digital computer processor implementing a graphic processing algorithm, including generating a visual representation of the data encoded by the data object using a graphical user interface.

A "classification scheme" is understood herein as a group of logical categories which are descriptive of a portion of content information of a document. The categories in the classification scheme may be organized in a logical (e.g. hierarchical) sub-structure (e.g. sub-groups). The process of assigning a category to one or more image segments of a digital image representing a portion of a document, and a result thereof, are both referred to herein as "categorization".

An "image segment" is understood herein as any contiguous portion of digital image data which has a high probability of encoding a structure which, when displayed on a graphical user interface, represents a separate item of human-readable information (the "content information") such as text characters, a photographic picture, a box in a flow diagram, etc. The process of determining a decomposition of a digital image into one or more detached image segments, and a result thereof, are both referred to herein as "segmentation". An image segment may comprise, for instance, one or more words, a text line, a table cell, line or column, a picture, drawing or diagram. In a visual representation of the digital image, image segments are typically clearly separated by "white space" (an empty area) or a dividing line. Without limitation, an image segment may be shaped as a rectangular box (in which case the segmentation would be called a "box model"). An image segment is also to be understood as a logical unit which may comprise one or more subordinate image segments or portions thereof. The segmentation may be performed using e.g. a known image segmentation algorithm or a machine learning model trained for this purpose.

A "graph model" or "knowledge graph" is understood herein as a graph data structure comprising nodes and edges interconnecting the nodes, wherein each node comprises at least an identifier of a category descriptive of a portion of content information of a document, or a link representing such category; and a content information captured from a digital image representing a portion of a document, or a link to a data source where such content information is available.

The term "machine learning" refers to a computer algorithm used to extract useful information from training data sets by building probabilistic models (referred to as machine learning models) in an automated way. The machine learning may be performed using one or more learning algorithms such as linear regression, K-means, classification algorithm, reinforcement algorithm etc. A "machine learning model" may for example be an equation or set of rules that makes it possible to predict an unmeasured value (e.g. which tag corresponds to a given token) from other, known values and/or to predict or select an action to maximize a future reward. According to embodiments, the machine learning model is a deep learning model.

The method for digitizing a document may have the advantage of simplifying the digitization process of the document by effectively attaching the device generating the digital image (e.g. a scanning device) directly to a knowledge graph. The information encoded in the digital images is decoded by the capturing step and therefore made accessible to further computer-based processing. This may make all the data enclosed in the document accessible in a non-graphical format and searchable for all parties involved. In this way, a higher degree of digitization may be achieved compared to a mere storage of the digital image representations of the document.

The method may further allow a user to verify the quality of extraction of the content information in a time frame which is typically not longer than the time for acquiring the digital image, and thus prevent or alleviate potential losses of content information.

The step of selecting digitization segments may allow for automatically filtering out potentially irrelevant information and may thus reduce the amount of data to be stored in the graph data structure.

An exemplary practical application envisions that a network-attached scanning device can connect (for example, using a cryptographically secured connection) to a knowledge-graph engine, e.g. using a REST-API interface. After the user has scanned the document(s), the engine may then, for instance, process the scans (e.g. performing optical character recognition (OCR), identifying document components such as tables, etc.); automatically dissect the document into components (paragraphs, tables, figures, references, etc.), keeping all connections (e.g. paragraph x coming from document y); present the content of the scanned document to a user and indicate potential issues (e.g. by flagging an image segment if the confidence of the OCR for that segment is low, allowing the user to re-scan that part as a replacement area with a higher resolution); and automatically process the components to extract keywords and NLP entities which can be searched for.

Using a graph model for digitizing contents of a document may be beneficial for providing a data structure which allows for a dynamic and/or hierarchic arrangement of the document data. This way of arranging document data may be structurally similar to the original structure of the document. In an example, the document as a whole is represented by a first node, which is an ancestor to several nodes representing authors of the document, affiliations of the authors, a date of publication, an abstract, a text content part, an image content part, a tabular content part, a references content part, etc.; and one or of these in turn being ancestors to further content structure nodes, e.g. chapters 1, 2, 3, etc. being descendants of the text content part node, each reference being represented by a descendant of the references node, etc. In another example, the graph comprises a document node representing the document as a whole and being an ancestor to several nodes representing pages of the document. The captured content of the document may then be stored on a per-page basis.

Using a graph may yield advantages regarding improved searchability, indexing etc. using specialized algorithms implementing graph operations. Graph nodes may be vertically connected by cross edges connecting nodes which do not form an ancestor/descendant pair, which may be used e.g. for connecting nodes representing content information of the document which is arranged in a subsequent manner in the original document. This may take into account that many documents are semantically structured in a sequential manner to enable human-reading accessibility. Digitizing content in a graph model may therefore offer a reproduction of the content information with a structure which is truer to that of the original document.

A graph may have the further advantage of providing the ability to connect multiple graphs to a common ancestor node, which may allow for generating a multi-document or library graph of e.g. all documents within a certain library or concerning a particular subject.

According to embodiments, the method further comprises providing a trained machine learning model having an input and an output, the selection of the category comprising providing the image and the identifier of the classification scheme to the input of the machine learning model, and in response to the providing, receiving from the output of the machine learning model the assignment of a category for each of the image segments.

Using a machine learning model may provide a correct categorization for each image segment with a higher probability. A trained machine learning model may infer the semantic category of a certain image segment e.g. from its size and/or position on the digital image, an absolute or relative page number assigned to the digital image, a geometrical structure and/or color composition of the image segment, and/or a font size recognized in the image segment if it carries text information.

In one embodiment, the machine learning model is specific to the classification scheme, and hence to the type of document represented by the digital image. This may take into account that many documents are structured according to a document type defined by e.g., a specific layout and/or semantic structuring which are identical for all documents of this type.

According to embodiments, the method further comprises: receiving training sets, each training set comprising a digital training image, a segmentation of the training image into one or more training image segments, and for each of the training image segments, an assignment of a category to the image segment; and executing a learning algorithm on the training sets for generating the machine learning model.

This may enable a training of the machine learning model for a specific purpose and thus increase the probability of correctly assigning a category to a given image segment. For instance, the machine learning model may be provided with digital images of documents of one selected document type, which may result in a specialization of the machine learning model to this document type.

According to embodiments, the learning algorithm further comprises, for a given training image segment, adding the category assigned to the given training image segment to the classification scheme in case the classification scheme does not comprise the category assigned to the given training image segment.

In analogy to the training of the machine learning model, classification schemes may be provided which are specific to the respective purpose or document type. In this way, the machine learning model may acquire a specialization for the respective document type, and a series of differently specialized machine learning models can be trained and provided.

According to embodiments, the method further comprises determining a quality indicator from the digital image and storing the quality indicator in the graph model.

A quality indicator may represent an image quality (e.g. skew, blur, dirt) of the digital image and/or a quality of the capturing of the content information (e.g. intrinsic score of the OCR algorithm, confidence deciding whether an image segment encodes an element of a table or a flow diagram, resolution). The term "quality" is understood herein in a broad sense which is not confined to image or capturing quality, but rather refers to any metric which can be automatically determined from the image segments and/or the captured content information. The quality indicator may be implemented in various ways, e.g. as an integer number/percentage, a character string, or a numeric or non-numeric level.

This may have various advantages. The storage of the quality indicator in the graph model may allow for filtering the content by values of the quality indicator. The quality indicator may also be displayed to a user on a graphical user interface, which may allow the user e.g. to select or discard image segments depending on their respective values of the quality indicator, or decide whether a portion of the digital image should be rescanned, e.g. at a higher resolution or after cleaning the object glass of the scanner.

According to embodiments, the quality indicator is determined from the digitization segments, each segment node further comprising the quality indicator determined from the digitization segment represented by the segment node.

Segment-specific quality indicators may help to locate digitization errors. For instance, low-quality segments may be displayed on a graphical user interface according to a color scheme to help the user identify probably faulty segments. This may reduce the user's effort for improving the quality of the digital image, e.g. by performing a corrective algorithm such as dust removal, sharpening, changing contrast and brightness, etc. or by repeating the digitization of the faulty area with improved settings, e.g. a higher resolution or a different color correction scheme. If a higher degree of automation is desired, segment-specific quality indicators may also increase the yield of correctly captured content information, e.g. by preventing discarding a whole document page only because one segment is faulty.

According to embodiments, the classification scheme comprises an error category, the error category being assigned to a given image segment in case the quality indicator is below a predetermined quality threshold value.

An error category may be used to highlight possibly faulty segments on a graphical user interface and/or in the graph data structure. This may facilitate a specific treatment of these segments, e.g. by filtering them out during a search operation on the graph model, or by filtering out all non-error segments to enable quality improvement activities.

According to embodiments, the method further comprises providing the image and the segmentation to a user interface.

This may enable a user to approve, reject or change the segmentation and/or the categorization, and/or perform further processing on the digital image e.g. to improve the image quality. Presentation on a graphical user interface may allow for receiving a user feedback and performing an adequate reaction such as terminating the digitization in case the user feedback indicates rejection of the image and continuing the digitization in case the user feedback indicates acceptance of the image.

According to embodiments, the method further comprises, before the population of the graph model, for a given one of the image segments, receiving from the user interface an assignment of an updated category to the given image segment, and in response to the receipt of the assignment of the updated category, reassigning the given image segment to the updated category.

This may improve the correctness of reproduction of the document by the graph model by reducing the number of false category assignments. The segments can subsequently be imported into the graph model with the updated category assignment while the original categorization of the updated segments can be discarded.

According to embodiments, the method further comprises, before the population of the graph model, receiving from the user interface a digital replacement image, the replacement image being assigned to a replacement area of the image, wherein zero or more area segments of the image segments lie at least partially within the replacement area, the method further comprising, before the population of the graph model: determining a replacement segmentation of the replacement image into one or more replacement image segments; for each of the replacement image segments, capturing content information from the replacement image and assigning a category to the replacement image segment, the category being selected from the classification scheme; updating the digital image by replacing the replacement area by the replacement image; updating the segmentation by replacing the area segments by the replacement image segments; and providing the updated image and the updated segmentation to the user interface.

This may improve the correctness of reproduction of the document by giving the user the possibility to repeat the acquisition of a portion of the digital image and thus prevent inaccuracy and/or loss of content information in the graph model compared to the original document.

According to embodiments, the method further comprises, before the population of the graph model, receiving from the user interface an updated segmentation of the image into one or more updated image segments, and updating the segmentation by replacing the image segments with the updated image segments.

This may further improve the correctness of reproduction by giving the possibility to repeat the content capturing with an improved segmentation.

According to embodiments, each edge of the graph model has assigned an edge weight.

Edge weights may give the possibility to calculate a total weight or probability when traversing the graph, and thus enable to deploy algorithms with a weighted output such as ranking of search results. In an example, the edge weights are determined based on a quality indicator for the segmentation and/or the categorization, and/or one or more probability figures received from the output of a trained machine learning model for performing the categorization and/or a segmentation algorithm.

According to embodiments, each edge of the graph model has assigned an edge type.

Edge types may indicate a behavior or character of the edges such as a forward edge when traversing a pair of nodes in ancestor-to-descendant direction, a backward edge when traversing a pair of nodes in descendant-to-ancestor direction, a horizontal edge when traversing a pair of nodes having the same ancestor ("siblings"), or a cross edge otherwise. The edge type may be determined based e.g. on the segmentation and/or the categorization of the digital image. A graph model using edge types may decrease the demand for computational resources for performing graph operations (e.g. a search algorithm) on the graph model.

According to embodiments, the classification scheme comprises an exclusion category, the selection of the digitization segments comprising excluding from the selection each image segment having assigned the exclusion category.

This may have the advantage of reducing the complexity of the graph model by providing a means to filter out content which is e.g. technical, repetitive, generic or legal information, or otherwise irrelevant to a main content of the document.

According to embodiments, the method further comprises clustering one or more cluster segments of the image segments in a segment cluster and adding the segment cluster to the segmentation, the population of the graph model further comprising, in case the segment cluster is selected as an digitization segment, representing the cluster segments by child nodes of the segment node representing the segment cluster.

The described clustering approach may enable an efficient use of the graph data structure for representations of hierarchic content information. For instance, the rows, columns, or cells of a table may be clustered, or several paragraphs of text within the same chapter or section, or a picture and its description. Clustering may be nested, e.g. a table may be a cluster of rows and each row a cluster of column cells.

According to embodiments, the method further comprises receiving a final image information, wherein the population is delayed until the receipt of the final image information.

This may allow for deriving, for a given digital image, additional context information from previous and/or successive digital images, e.g. using a machine learning model or specialized algorithm adapted for parallel image analysis, which may increase the correctness of categorization.

According to embodiments, the method further comprises, before the population of the graph model: receiving a subsequent digital image and the identifier of the classification scheme, the image representing a subsequent portion of the document relative to the portion; determining a subsequent segmentation of the subsequent image into one or more subsequent image segments; for each of the subsequent image segments, capturing content information from the subsequent image segment and assigning a category to the subsequent image segment, the category being selected from the classification scheme; selecting one or more subsequent digitization segments from the subsequent segmentation; identifying a trailing segment of the digitization segments and a leading segment of the subsequent digitization segments, the category assigned to the leading segment being equal to the category assigned to the trailing segment; determining a continuation probability, the continuation probability being descriptive of whether the content information of the leading segment is a sequel to the content information of the trailing segment; and in case the continuation probability is equal to or greater than a predefined combination threshold value: generating a merge segment, the merge segment comprising the trailing segment and the leading segment appended to the trailing segment, the merge segment having assigned the category assigned to the trailing segment and merge content information, the merge content information comprising the content information of the trailing segment and the content information of the leading segment appended to the content information of the trailing segment; deleting the trailing segment from the segmentation and the leading segment from the subsequent segmentation; and adding the merge segment to one of the segmentation or the subsequent segmentation.

This may reduce the influence of page transitions on the structure of the content information and therefore enable a more content-based graph representation of the document rather than a page-based representation.

According to embodiments, the digital image is received from an image scanner.

The use of an image scanner may ensure that the digital image is obtained with a high quality, e.g. due to the typically short distance between the image sensor of the scanner and the document and/or the presence of pressure for reducing a possible surface curvature of printed pages of the document.

According to embodiments, the graph model comprises a tree data structure.

A tree data structure may ensure that each node is assigned to a document by a chain of ancestor/descendant (parent/child) relations. The directed nature of the edges may simplify search operations and facilitate a faithful reproduction of hierarchically structured content of the document.

According to embodiments, the method is implemented as software running on a server in a cloud computing environment offering performance of the method as a service to a client user of the cloud computing environment.

Now turning to the drawings, FIG. 1 shows a flow diagram of an exemplary computer-implemented method 100 for digitizing a document. The method may be implemented by any suitable computing means involving one or more processors, software, hardware, virtual machines, etc. One or more of the steps described hereunder, in particular step S110, may be performed by a dedicated computing means for receiving the digital image together with its segmentation and categorization as an input and determining the graph model as an output, which is referred to as "knowledge graph engine" herein.

The method starts with receiving S102 a digital image of a portion of a document together with an identifier of a classification scheme assigned to the document. In step S104 a segmentation of the digital image into one or more image segments is determined. This may be done by a suitable computing approach such as a machine learning model trained for this purpose or a box modeling algorithm which analyzes the two-dimensional structure of the graphical information encoded in the digital image, e.g. taking into account gaps and/or lines separating rectangular areas of graphical information.

In step S106, the image segments are analyzed for capturing content information such as text or pictures from each segment and assigning a category to each image segment, e.g. using a capturing algorithm such as optical character recognition (OCR) and/or a trained machine learning model. The category is selected from the classification scheme defined by the identifier based on e.g. a position, dimensions, color distribution, etc. of the respective segment. The capturing means may be specific to the classification scheme defined by the identifier.

In response, zero or more of the image segments are selected S108 as digitization segments for later incorporation into the graph model. The selection of a particular image segment may be based on various metrics, including without limitation the category assigned to the segment, a user feedback comprising an updated categorization received from a user interface in response to providing the categorization to the user interface, and/or a quality indicator determined for the digital image as a whole and/or the given image segment.

Eventually, a graph model is provided and populated S110 with nodes representing the selected digitization segments. Logical connections between nodes such as an assignment to a particular page, chapter, section, figure, document, keyword etc., or an indication of subsequent arrangement such as subsequent pages, sections, paragraphs, figures, tables, formulas etc. may be represented by edges connecting the nodes. The nodes may be established based on the assigned categories, keywords found in the captured content information, provenance on a particular image, dimensions, relative distance, color distribution etc. of the nodes to be connected. Again, the graph model population S110 may be implemented, for instance, as a static graph building algorithm or a trained machine learning model which may be specific to the classification scheme defined by the identifier.

Figure 2:
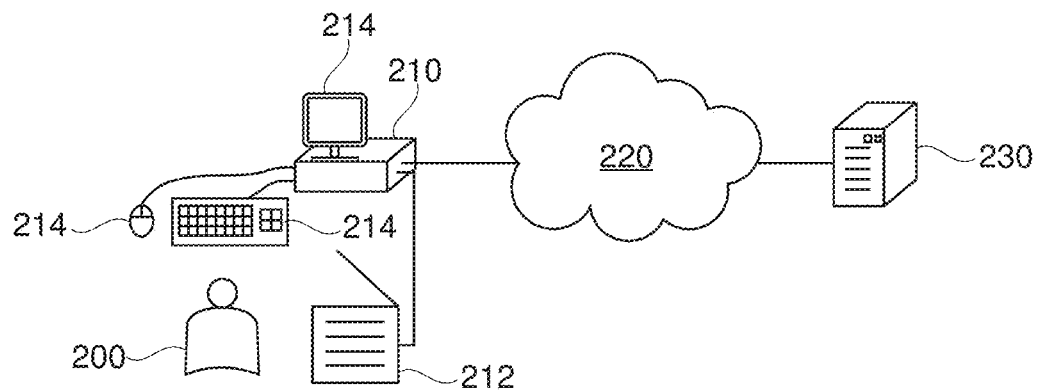
FIG. 2 depicts an exemplary computing environment adapted for implementing the method for digitizing a document.

FIG. 2 depicts an exemplary computing environment adapted for implementing the method for digitizing a document. A user is equipped with an image acquisition device 212 and a computing device 210, with which the user interacts via a user interface 214. The image acquisition device 212 (e.g. a scanner or a digital camera) is communicatively connected to and controlled by the computing device 210. In an example, the image acquisition device is a high-throughput scanner (e.g. capable of acquiring ten or more digital images per minute, each from a different original). The computing device 210 is further communicatively connected to a communications network 220. In an example, the connection between the computing device 210 and the image acquisition device 212 is established via the network 220. The network communicatively couples the computing device 210 to a server 230 which is adapted for performing the method for digitizing a document in response to a request by the computing device 210 (on behalf of the user 200). In an example, the network 220 and the server 230 are components of a cloud computing environment.

The exemplary computing environment of FIG. 2 may be used to implement the following exemplary protocol which utilizes the method for digitizing a document. In an optional first step, a logical connection is established between the server 230 and the image acquisition device 212, e.g. by the user utilizing the computing device 210 to log in at the server 230. The user 200 uses the user interface 214 to specify a classification scheme for a document to be digitized and uses the computing device 210 to control the image acquisition device 212 to acquire a digital image of a portion of the document to be digitized. The computing device 210 receives the digital image from the image acquisition device 212 and forwards it to the server 230 via network 220. The server 230 may also collect metadata of the digitization process, e.g. a time of receipt and an identifier of the image acquisition device 212, the computing device 210 and/or the user 200.

In an alternative example, the user 200 uses the computing device 210 to control the image acquisition device 212 to acquire a digital image of a portion of the document to be digitized without specifying a classification scheme. In this example, the computing device 210 receives the digital image from the image acquisition device 212 and forwards it to the server 230 via network 220. The server 230 then analyzes the received image (e.g. using a pattern recognition algorithm or a trained machine learning model) to determine a best matching classification scheme e.g. based on a visual structure and/or a color composition of the image.

Based on the classification scheme, the server 230 then executes a segmentation algorithm to determine a segmentation of the image into one or more image segments. The server then selects and executes a trained machine learning model and/or one or more content type recognition and capturing routines for assigning a category to each image segment and capturing content information from each segment. Exemplary categories include, without limitation, text paragraph, text line, table, table cell, table column, table line, picture, formula, title, subtitle, author name, author affiliation, abstract, publication date, page number, journal title, footnote, literature reference, etc.

The server then sends the segmentation and the categorization to the computing device 210 for display, together with the digital image still in a memory of the computing device 210, on the user interface 214. In an example, the server 230 also sends the captured content information to the computing device 210 for display on the user interface 214 to allow a more detailed inspection by the user 200. If the user 200 is satisfied with the result, the user 200 sends a confirmation information to the server 230 (e.g. by clicking an "OK" button on the user interface 214) and the server 230 continues the digitization in response thereto. If the user 200 is not satisfied, the user may use the user interface 214 to either reject the image and the categorized segmentation, or input an updated segmentation and/or an updated categorization and/or use the image acquisition device 212 to acquire a digital replacement image for a replacement area of the image.

In case of acquiring a replacement image, the replacement image is sent to the server 230 by the computing device 210, and in response, the server 230 performs a segmentation of the replacement image into replacement image segments, a categorization for each of the replacement segments, and a content capturing for each of the replacement segments; replaces the replacement area of the image by the replacement image; replaces all area segments lying at least partially in the replacement area by the categorized replacement segments and optionally sends some or all of the replacement results to the computing device 210 for updating the user interface 214 and repeating the query to the user 200 for either accepting the updated results, or further amending the image and/or the results, or rejecting the updated image and results.

In an alternative example, the server 230 sends the results mentioned before back to the computing device 210, but only for silent reporting (e.g. log file generation) without display to the user 200, and continues with the digitization as described below. In another alternative example, the server 230, does not send a result to the computing device, but continues with the digitization as described below.

The categorized segmentation, as accepted by the user 200, is then adopted by the server 230 as a selection of digitization segments to be incorporated into the graph model. In an alternative example, the server selects the digitization segments from the segmentation e.g. based on the category assigned to each segment and/or a quality indicator assigned to the digital image and/or each segment.

The server 230 then executes a graph engine to populate a graph model with nodes representing the categorized captured content information. Optionally, the graph engine includes the image segments and/or further metadata such as keywords, natural-language-processing (NLP) entities, and/or quality indicator(s) into the graph model. Relations between the segments such as a hierarchical and/or a sequential order may be represented by edges connecting the nodes. The graph model can comprise a root node representing the document as a whole. The root node may comprise further metadata such as the selected classification scheme, a document identifier, a date of generation of the graph, a list of identifiers of the digital images recorded from the document, etc. The graph may comprise the information "as is", or alternatively references (e.g. hyperlinks) to one or more resources from which the information stored in the graph model can be retrieved.

Figure 3:
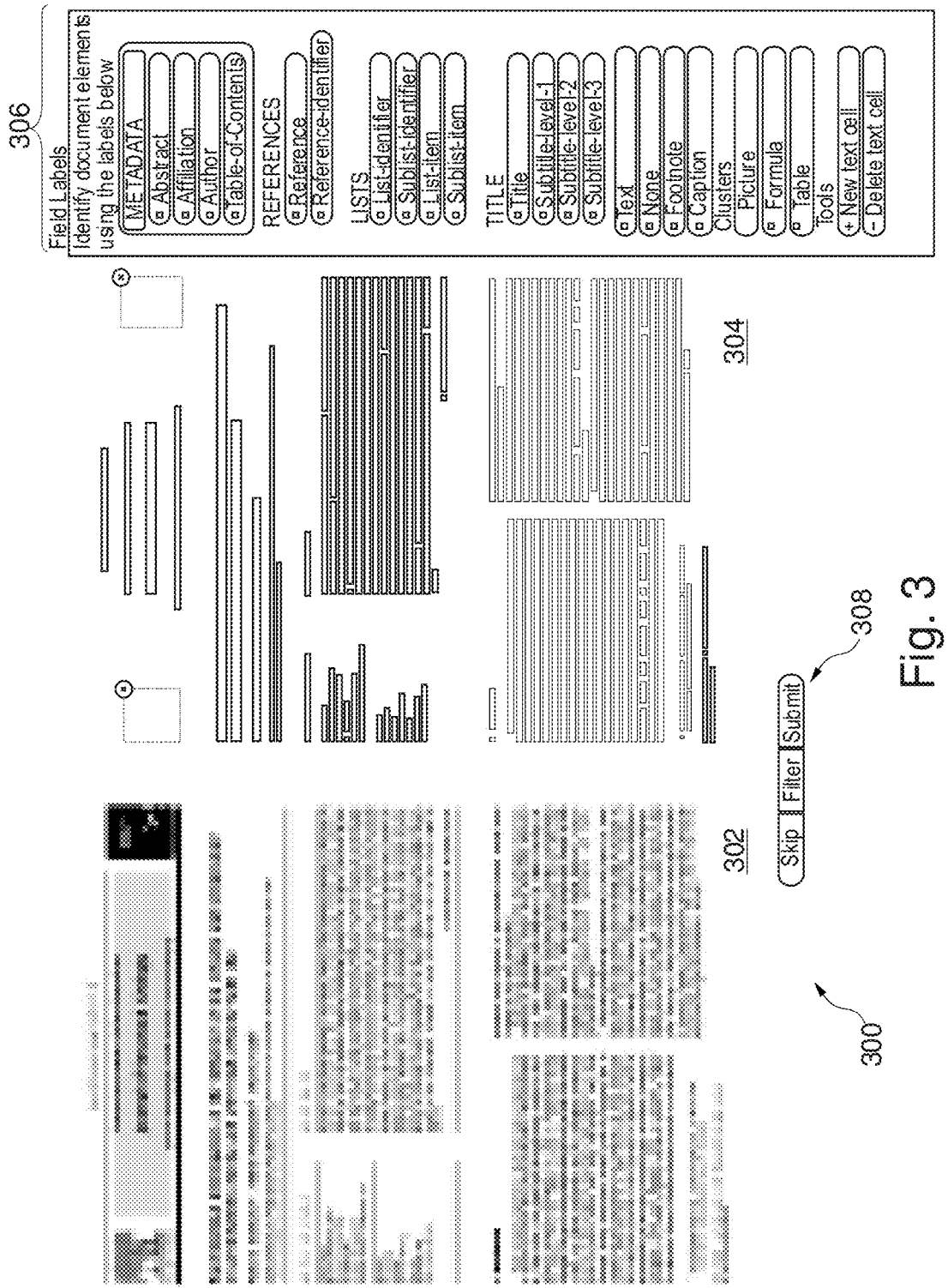
FIG. 3 depicts an exemplary graphical user interface for displaying a segmentation and segment categorization of a digital image representing a portion of a document.

FIG. 3 depicts an exemplary graphical user interface (GUI) for displaying a segmentation and segment categorization of a digital image representing a portion of a document. The GUI comprises an image view 302 for displaying a digital image (left panel), a segmentation view 304 for displaying a segmentation of the digital image (middle panel), a category view 306 (right panel) for displaying a list of categories, and control buttons 308 (centered below the image view 302 and the segmentation view 304) for controlling a segmentation review process. The image view 302 is shown displaying a digital image acquired from a portion of a document.

The segmentation view 304 is shown displaying a box-model segmentation of the same digital image. In the segmentation view, straight lines and white spaces visible in the digital image are interpreted as separators and are both displayed as white spaces. The box model comprises numerous rectangular boxes, each representing a word, a line, an image, or any other non-white element visible on the digital image. Each box in the box model represents an image segment of the digital image and is assigned a category from the category view 306. The categories are displayed in the segmentation view 304 according to a color scheme displayed in the category view 306.

The segmentation view 304 may comprise further functionalities such as mouse editing of the segments. In an example, a user of GUI 300 may use a left mouse button for selecting one or more boxes (segments) and a right mouse button to open a context menu for a present selection of boxes (segments).

The category view 306 comprises a grouped list of all categories present in the classification scheme, each with the color assigned according to the color scheme. For instance, the categories "Abstract", "Affiliation", "Author" and "Table of contents" are grouped in a "Metadata" group. The categories also comprise an exclusion category "None" which marks any segment to be excluded from incorporation into the graph model. Some categories such as "Text", "None", "Footnote" and "Caption" are not assigned to a category group. Some categories such as "Picture", "Formula" and "Table" are listed as cluster categories as these content types typically involve clustered segments (e.g. multiple cells, a table caption and table footnotes forming a table segment, a picture and a caption forming a picture segment, a formula (which may comprise multiple lines) and a formula number forming a formula segment). The category view 306 further comprises a control button "New text cell" for manually adding (defining) a new category and a control button "Delete text cell" for manually removing (destroying) a selected existing category.

The control buttons 308 shown comprise a "Skip" button for delaying or preventing the projected population of the graph model, a "Filter" button for defining or selecting a filter criterion for categories to be edited or excluded from the graph model population, and a "Submit" button for triggering the graph model population with the categorized segmentation as displayed in the segmentation view 304.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. Computer-implemented method for digitizing a document, the document having assigned a classification scheme, the method comprising:
   receiving a digital image and an identifier of the classification scheme, the image representing a portion of the document;
   determining a segmentation of the image into one or more image segments;
   for each of the image segments, capturing content information from the image segment and assigning a category to the image segment, the category being selected from the classification scheme;
   selecting one or more digitization segments from the segmentation; and
   populating a graph model of the document, wherein each of the digitization segments is represented by a segment node of the graph model, each segment node indicating the category assigned to the digitization segment represented by the segment node and the content information captured from the digitization segment represented by the segment node.

2. The method of claim 1, further comprising providing a trained machine learning model having an input and an output, the selection of the category comprising providing the image and the identifier of the classification scheme to the input of the machine learning model, and in response to the providing, receiving from the output of the machine learning model the assignment of a category for each of the image segments.

3. The method of claim 2, further comprising:
   receiving training sets, each training set comprising a digital training image, a segmentation of the training image into one or more training image segments, and for each of the training image segments, an assignment of a category to the image segment; and
   executing a learning algorithm on the training sets for generating the machine learning model.

4. The method of claim 3, the learning algorithm further comprising, for a given training image segment, adding the category assigned to the given training image segment to the classification scheme in case the classification scheme does not comprise the category assigned to the given training image segment.

5. The method of claim 1, further comprising determining a quality indicator from the digital image and storing the quality indicator in the graph model.

6. The method of claim 5, the quality indicator being determined from the digitization segments, each segment node further comprising the quality indicator determined from the digitization segment represented by the segment node.

7. The method of claim 6, the classification scheme comprising an error category, the error category being assigned to a given image segment in case the quality indicator is below a predetermined quality threshold value.

8. The method of claim 1, further comprising providing the image and the segmentation to a user interface.

9. The method of claim 8, further comprising, before the population of the graph model, for a given one of the image segments, receiving from the user interface an assignment of an updated category to the given image segment, and in response to the receipt of the assignment of the updated category, reassigning the given image segment to the updated category.

10. The method of claim 8, further comprising, before the population of the graph model, receiving from the user interface a digital replacement image, the replacement image being assigned to a replacement area of the image, wherein zero or more area segments of the image segments lie at least partially within the replacement area, the method further comprising, before the population of the graph model:
- determining a replacement segmentation of the replacement image into one or more replacement image segments;
- for each of the replacement image segments, capturing content information from the replacement image and assigning a category to the replacement image segment, the category being selected from the classification scheme;
- updating the digital image by replacing the replacement area by the replacement image;
- updating the segmentation by replacing the area segments by the replacement image segments; and
- providing the updated image and the updated segmentation to the user interface.

11. The method of claim 8, further comprising, before the population of the graph model, receiving from the user interface an updated segmentation of the image into one or more updated image segments, and updating the segmentation by replacing the image segments with the updated image segments.

12. The method of claim 1, each edge of the graph model having assigned an edge weight.

13. The method of claim 1, each edge of the graph model having assigned an edge type.

14. The method of claim 1, the classification scheme comprising an exclusion category, the selection of the digitization segments comprising excluding from the selection each image segment having assigned the exclusion category.

15. The method of claim 1, further comprising clustering one or more cluster segments of the image segments in a segment cluster and adding the segment cluster to the segmentation, the population of the graph model further comprising, in case the segment cluster is selected as an digitization segment, representing the cluster segments by child nodes of the segment node representing the segment cluster.

16. The method of claim 1, further comprising receiving a final image information, wherein the population is delayed until the receipt of the final image information.

17. The method of claim 16, further comprising, before the population of the graph model:
- receiving a subsequent digital image and the identifier of the classification scheme, the image representing a subsequent portion of the document relative to the portion;
- determining a subsequent segmentation of the subsequent image into one or more subsequent image segments;
- for each of the subsequent image segments, capturing content information from the subsequent image segment and assigning a category to the subsequent image segment, the category being selected from the classification scheme;
- selecting one or more subsequent digitization segments from the subsequent segmentation;
- identifying a trailing segment of the digitization segments and a leading segment of the subsequent digitization segments, the category assigned to the leading segment being equal to the category assigned to the trailing segment;
- determining a continuation probability, the continuation probability being descriptive of whether the content information of the leading segment is a sequel to the content information of the trailing segment; and
- in case the continuation probability is equal to or greater than a predefined combination threshold value:
- generating a merge segment, the merge segment comprising the trailing segment and the leading segment appended to the trailing segment, the merge segment having assigned the category assigned to the trailing segment and merge content information, the merge content information comprising the content information of the trailing segment and the content information of the leading segment appended to the content information of the trailing segment;
- deleting the trailing segment from the segmentation and the leading segment from the subsequent segmentation; and
- adding the merge segment to one of the segmentation or the subsequent segmentation.

18. The method of claim 1, the digital image being received from an image scanner.

19. The method of claim 1, the graph model comprising a tree data structure.

20. A computer program product, in particular a computer readable medium, the computer program product carrying computer executable code for execution by a processor controlling an apparatus, wherein execution of the instructions cause the processor to perform a method for digitizing a document, the document having assigned a predetermined classification scheme, the method comprising:
- receiving a digital image, the image representing a portion of the document;
- determining a segmentation of the image into one or more image segments;
- for each of the image segments, capturing content information from the image segment and assigning a category to the image segment, the category being selected from the classification scheme;
- selecting one or more digitization segments from the segmentation; and
- populating a graph model of the document, wherein each of the digitization segments is represented by a segment node of the graph model, each segment node comprising the category assigned to the digitization segment represented by the segment node and the content information captured from the digitization segment represented by the segment node.

* * * * *